Jan. 18, 1955  C. GRUPP  2,699,691
PROCESS AND APPARATUS FOR GRINDING CIRCULAR SAW BLADES
Original Filed Oct. 18, 1951

INVENTOR
CHRISTIAN GRUPP.
BY

United States Patent Office 2,699,691
Patented Jan. 18, 1955

2,699,691

PROCESS AND APPARATUS FOR GRINDING CIRCULAR SAW BLADES

Christian Grupp, Oberkochen, Germany, assignor to Wilhelm Grupp Offene Handelgesellschaft Werkzeug- und Maschinenfabrik, Oberkochen (Wurtt), Germany Original application October 18, 1951, Serial No. 251,857. Divided and this application September 16, 1952, Serial No. 311,479

Claims priority, application Austria April 16, 1951

5 Claims. (Cl. 76—37)

The present invention relates to a process and apparatus for grinding circular saw blades.

This application is a division of application Serial No. 251,857, filed October 18, 1951, now abandoned One of the objects of the present invention is to provide an exceedingly simple and inexpensive apparatus for accurately grinding circular saw blades.

Another object of the present invention is to provide a process and apparatus for grinding circular saw blades in such a manner that uniform sharpening of the teeth of the saw blade is guaranteed.

Still another object of the present invention is to provide a process and apparatus for grinding circular saw blades in such a manner that the points of the teeth of the circular saw blade are all located on a single circle.

An additional object of the present invention is to provide an apparatus for grinding circular saw blades which enables the grinding wheel to be uniformly worn away over the width of the peripheral grinding surface thereof.

With the above object in view, the present invention mainly consists of a process and apparatus in which the saw blade is mounted with its axis parallel to the axis of rotation of the grinding wheel. Then, the grinding wheel is moved about the axis of the saw blade, which is held stationary on the shaft on which it is mounted by a stop pin engaging a groove in the saw blade before one of the teeth thereof, so that the outer edge of the saw blade is ground and the back of a tooth of the saw blade is given a predetermined curvature controlled by the grinding wheel. The grinding wheel is mounted on a drive means which is itself mounted on at least one bar member and adapted to be both roughly and finely adjusted with respect to the saw blade so as to accurately locate the grinding wheel with respect to the saw blade. The stop pin engages the saw blade to prevent rotation thereof while permitting the saw blade to be moved in the direction of its axis so as to render all portions of the peripheral surface of the grinding wheel usable and thereby prevent the formation of grooves in the grinding wheel and the necessity of periodically dressing the same. The adjustable mounting of the stop pin permits the apparatus to accommodate grinding wheels of different diameters.

In conventional apparatus for grinding circular saw blades, the axes of the saw blade and grinding wheel are generally perpendicular to each other, and either the saw blade or the grinding wheel must be controlled properly so as to properly change the distance between their axes during the grinding of the saw blade. With the device and process of the present invention, however, the axes of the saw blade and grinding wheel are kept at a uniform distance from each other so that this latter difficulty of a conventional apparatus is avoided. Moreover, with a conventional apparatus it is difficult to grind all the teeth of the saw blade so that their outer points are located along a single circle. But this latter result is assured with the process and apparatus of the present invention.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
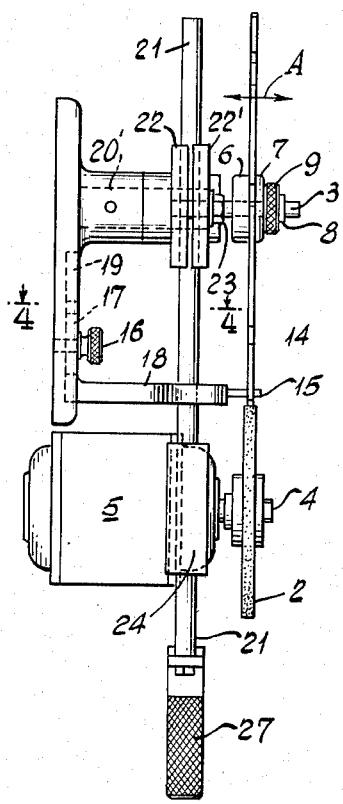
Fig. 1 shows a vertical side elevation of one possible apparatus for carrying out the present invention.

Referring now to the drawings, Fig. 1 shows a support member 20 which is fixedly mounted and which carries a shaft 20' having an end portion distant from the support 20. In this latter end portion of the shaft 20' there is fixedly mounted the shaft 3 which extends from shaft 20'. Slidably mounted on the shaft 3 is the annular member 6 which has a hollow portion 8 extending therefrom and located about the shaft 3 for slidable movement thereon. A circular blade 1, to be ground, is mounted directly on the annular member 6 about the hollow portion 8 extending therefrom, and a washer member 7 is located on the other side of the saw blade 1 from the annular portion 6, this washer member 7 also extending about the hollow portion 8 extending from member 6. The hollow portion 8 may be formed integrally with the annular member 6 and is threaded on its outer surface to receive the knurled nut member 9 which releasably clamps the saw blade 1 between the members 6 and 7.

Mounted for rotation about the shaft 20', and also about the shaft 3, is a bearing member 22 which has flanges at opposite ends thereof to cooperate with angularly bent clamping members 22' which are connected to the bearing member 22 by the bolts 23 which pass through the clamping members 22' and threadedly engage the bearing member 22. The bar members 21 extend across the bearing member 22 and between the flanges thereof and the angular clamping members 22' which are of substantially the same dimensions as these flanges. The bar members 21 are held in place on the bearing member 22 by tightening of the bolts 23.

Figure 2:
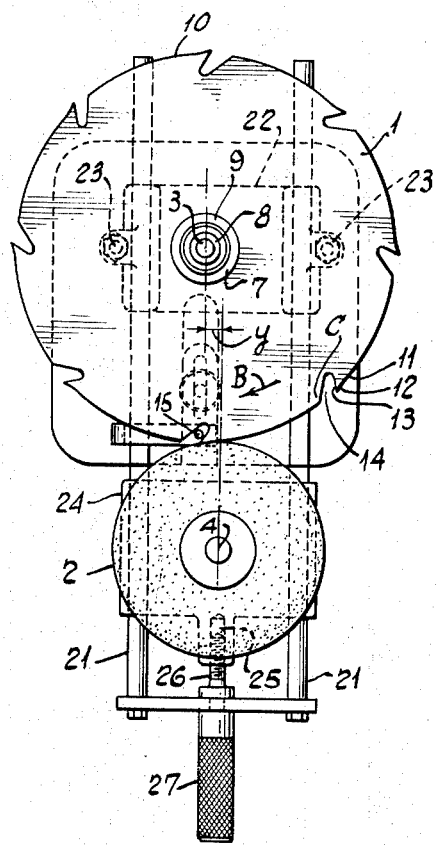
Fig. 2 shows a front elevation of the apparatus of Fig. 1 taken at 90° from the view of the apparatus illustrated in Fig. 1.

A member 24 extends beneath and across the bar members 21, and at its outer ends the member 24 extends around the bar members 21, as shown in Fig. 1, so that the member 24 is mounted for sliding movement along the bar members 21. The motor 5 is fixed to the member 24, and the shaft 4 of the motor 5 extends through an opening of member 24 and has the grinding wheel 2 mounted thereon for rotation therewith. The right hand end of each of the bar members 21, as viewed in Fig. 2, is interconnected by a bar on which the knurled handle member 27 is rotatably mounted, and this knurled handle member 27 has a threaded extension 26 which engages a threaded bore 25 of the member 24.

Figure 4:
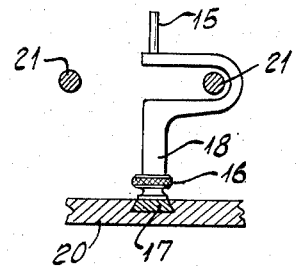
Fig. 4 is a partially sectional view illustrating a part of the apparatus of Figs. 1 and 2.

The support 20 is formed with a slideway 19 having inclined sides, as shown in Fig. 4, and in this slideway 19 is slidably mounted a foot member 17 which also has inclined sides mating with the sides of slideway 19 so that a slidable dovetail mounting for the foot member 17 is provided. Supporting post 18 extends upwardly from the foot member 17, to which post 18 is fixedly connected, and this post 18 is formed with a U-shaped bend so that the post 18 passes around the right hand bar member 21, as viewed in Fig. 4. Fixedly mounted on the outer end of supporting post 18 is a stop pin 15 which extends in a direction parallel to the shafts 3 and 4, which are themselves parallel to each other. The foot member 17 is formed with a slot extending along the length thereof (Fig. 2), and a bolt 16 having a knurled head extends through this slot and threadedly engages a threaded bore formed in the support 20, so that the bolt 16 may releasably clamp the foot member 17 in a desired position in the slideway 19 and thereby permit the stop pin 15 to be adjustably located at a desired position with respect to shaft 3.

The above described apparatus operates as follows:

When the circular saw blade 1 is to be placed in the apparatus to be ground thereby, the nut 9 is turned off from the threaded portion 8 extending from angular member 6, and the washer 7 is also removed from its position about the hollow threaded portion 8. The saw blade 1 is then placed about the hollow threaded portion 8 against the member 6 after which the washer 7 is replaced on the other side of saw blade 1 from member 6, and the nut 9 is then turned onto the hollow portion 8 so as to clamp the saw blade 1 between the members 6 and 7. The annular member 6 with the hollow portion 8 is slidably located on the shaft 3 so that the saw blade may be moved along with the gripping means formed by members 6—9 along the length of shaft 3 in the direction of the double-headed arrow A shown in Fig. 1. The bolt 16 is then loosened, and the foot member 17 with post 18 is then adjustably located in slideway 19 so that the stop pin 15 is located in the space of the saw blade 1 located before one of the teeth thereof, as is most clearly shown in Fig. 2. Bolt 16 is then tightened to releasably clamp the stop pin 15 in this latter position. The nut 9 may then be turned so as to turn the entire gripping means 6—9 and saw blade 1 therewith so as to place the forward face of the right-hand-most tooth of the saw blade 1, as viewed in Fig. 2, against the stop pin 15.

The bar members 21 then are swung with the bearing member 22 about the shaft 20' so as to locate the periphery of the grinding wheel at the point C of the saw blade 1, this point C being illustrated in Fig. 2. In order to properly locate the grinding wheel 2 at this point, the bolts 23 may be loosened and the bar members 21 moved across the bearing member 22 to roughly locate the grinding wheel 2 in the desired position. The bolts 23 are then tightened so as to releasably clamp the bar members 21 to the bearing 22, and then the handle member 27 is turned so as to move the member 24 along the bar members 21 and in this way finely adjust the position of the grinding wheel 2 so that it properly contacts the saw blade 1 at the point C. Electrical current is then supplied to the motor 5 by electrical connections and an electrical source not illustrated, and the bar members 21 are then turned with the bearing 22, the motor 5 and grinding wheel 2 about the axis of shaft 3 in the direction of arrow B until the grinding wheel reaches the position shown in Fig. 2.

Figure 3:
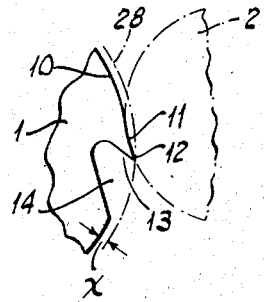
Fig. 3 shows a fragmentary diagrammatic view of the engagement between the grinding wheel and saw blade on an enlarged scale.

It will be seen that the grinding wheel grinds the toothless portion 10 of the saw blade 1 and the back of the tooth which has its front face abutting against the stop pin 15. Fig. 3 diagrammatically shows the grinding wheel 2 against the saw blade 1 in the position of the parts illustrated in Fig. 2, and it will be seen that the saw blade tooth, which has its front face 13 abutting against the stop pin 15 located in the space 14 of the saw blade 1, is formed by the grinding wheel with a point 12 and with a curved rear face 11.

After one tooth is ground, the next tooth is located in the above described position with respect to the stop pin 15, and this may be done simply by moving the saw blade along shaft 3 in the direction of arrow A of Fig. 1 so that the saw blade no longer engages the stop pin 15 after which the saw blade is turned and then moved back along the shaft 3 to engage the next tooth with the stop pin 15. The grinding wheel 2 is, in the meantime, turned back to the next point corresponding to the point C shown in Fig. 2, and the above process is repeated. All of the teeth of the saw blade may be ground in the same manner in a relatively short time.

Suitable stop members, not shown, may be provided to limit the movement of the bar members 21, and one of the stop members may be the U-shaped part of the supporting post 18, for example. It will be seen from Fig. 2 that when the grinding wheel 2 is at the end of its movement distant from point C, a first plane, including the shaft 4 and being parallel to the bars 21, is spaced by distance y from a second plane including the axis of shaft 3 and being parallel to the first plane. This distance y guarantees that the grinding wheel will produce a curved back face 11 on the tooth being ground.

It will be noted that with the above device, the saw blade portions 10, which do not have any teeth, are ground as well as the teeth themselves. In this way, the above process produces points 12 on the teeth of the saw blade which are all located on a single circle which has a radius greater than the radius of the portions 10 by the distance x, shown in Fig. 3 in an exaggerated scale, for the sake of clarity. In this way, the uniformity of all of the teeth is assured, and the location of the points 12 of all of the teeth on a single circle and projecting at a uniform distance from the body of the saw blade is also assured.

The slidable mounting of the gripping means 6—9 on the shaft 3 not only permits the saw blades to be quickly and easily moved so as to have successive teeth thereof properly located to be ground, but also this slidable mounting permits the saw blade to be located against different parts of the peripheral surface of the grinding wheel 2 so as to uniformly wear this grinding surface and prevent the formation of grooves therein. In this way the grinding wheel 2 is maintained in proper condition for a great length of time, and frequent dressing of the grinding wheel is avoided.

Although in the above described apparatus the grinding wheel is adapted to rotate about the axis of shaft 3, it is believed to be evident that the purview of the present invention also includes an apparatus wherein the shaft 3 is mounted for rotation about the axis of shaft 4. Moreover, drive means other than the motor 5 may be attached to the grinding wheel, and the latter may even be hand driven, if desired. Also, if desired, any mechanical means may be connected to the apparatus for automatically swinging the grinding wheel about the axis of shaft 3 or the shaft 3 about the axis of shaft 4.

It will be understood that each of the elements described above, or two or more together, may also find a useful application in other types of process and apparatus for grinding circular saw blades differing from the types described above.

While the invention has been illustrated and described as embodied in a process and apparatus for grinding circular saw blades and in which the axes of the saw blade and grinding wheel are located at a predetermined fixed distance from each other during the grinding of the saw blade, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for grinding circular saw blades, comprising in combination, a support member; a first shaft member fixedly mounted on said support member; clamping means slidably mounted on said first shaft member for clamping a circular saw blade and supporting the same for movement along said first shaft member; a stop pin parallel to said first shaft member and being slidably mounted on said support member for adjustable movement toward and away from said first shaft member so that said stop member may engage one of the teeth of a circular shaw blade to prevent rotation thereof on said first shaft member while permitting movement thereof along the length of said first shaft member, said adjustable movement of said stop pin permitting the same to be used with saw blades of different diameters; a second shaft member parallel to said first shaft member and stop pin and having a grinding wheel fixedly mounted thereon and extending transversely thereto; drive means fixedly connected to said shaft member for rotating the same and grinding wheel therewith; and connecting means connecting said second shaft member to said first shaft member for rotation with respect thereto, so that when a circular blade is mounted on said first shaft member in the plane of said grinding wheel and the latter contacts the periphery of the saw blade, the rotation of the driven grinding wheel about said first shaft member will cause the grinding wheel to grind the saw blade, the latter being prevented from rotating about said first shaft member by said stop pin while being able to move along said first shaft member so as to evenly wear the periphery of the grinding wheel along the thickness thereof.

2. An apparatus for grinding circular saw blades, comprising in combination, a support member; a first shaft member fixedly mounted on said support member; a bear ing member mounted on said support member for turning movement about said first shaft member; releasable clamping means mounted on said bearing member; at least one bar member extending across said bearing member transversely to said first shaft member and being releasably clamped to said bearing member by said clamping means so that said bar member may be adjustably connected to said bearing member; a second shaft member spaced from said first shaft member and being parallel thereto; drive means connected to said second shaft member for rotating same and being slidably mounted on said bar member for movement therealong; and screw means mounted only for rotation on said bar member and engaging said drive means for moving the same along said bar member upon rotation of said screw means, whereby, when a circular saw blade to be ground is mounted on said first shaft member and when a grinding wheel is mounted on said second shaft member for rotation therewith, the grinding wheel may have its location roughly adjusted with respect to the saw blade by moving said bar member in said clamping means when the latter is released and then clamping the same and the grinding wheel may have its location finely adjusted with respect to the saw blade by turning of said screw means.

3. An apparatus for grinding circular saw blades, comprising in combination, a support member; a first shaft member fixedly mounted on said support member; a bearing member mounted on said support member for turning movement about said first shaft member; releasable clamping means mounted on said bearing member; at least one bar member extending across said bearing member transversely to said first shaft member and being releasably clamped to said bearing member by said clamping means so that said bar member may be adjustably connected to said bearing member; a second shaft member spaced from said first shaft member and being parallel thereto; a stop pin mounted on said support member between said first and second shaft members and being parallel thereto; drive means connected to said second shaft member for rotating same and being slidably mounted on said bar member for movement therealong; and screw means mounted only for rotation on said bar member and engaging said drive means for moving the same along said bar member upon rotation of said screw means, whereby, when a circular saw blade to be ground is mounted on said first shaft member and engaged by said stop pin so as to prevent rotation of the circular saw blade and when a grinding wheel is mounted on said second shaft member for rotation therewith, the grinding wheel may have its location roughly adjusted with respect to the saw blade by moving said bar member in said clamping means when the latter is released and then clamping the same and the grinding wheel may have its location finely adjusted with respect to the saw blade by turning of said screw means.

4. An apparatus for grinding circular saw blades, comprising in combination, a support member; a first shaft member fixedly mounted on said support member; a bearing member mounted on said support member for turning movement about said first shaft member; releasable clamping means mounted on said bearing member; at least one bar member extending across said bearing member transversely to said first shaft member and being releasably clamped to said bearing member by said clamping means so that said bar member may be adjustably connected to said bearing member; a second shaft member spaced from said first shaft member and being parallel thereto; a stop pin mounted for adjustable movement on said support member between said first and second shaft members and being parallel thereto; drive means connected to said second shaft member for rotating same and being slidably mounted on said bar member for movement therealong; and screw means mounted only for rotation on said bar member and engaging said drive means for moving the same along said bar member upon rotation of said screw means, whereby, when a circular saw blade to be ground is mounted on said first shaft member and engaged by said stop pin so as to prevent rotation of the circular saw blade and when a grinding wheel is mounted on said second shaft member for rotation therewith, the grinding wheel may have its location roughly adjusted with respect to the saw blade by moving said bar member in said clamping means when the latter is released and then clamping the same and the grinding wheel may have its location finely adjusted with respect to the saw blade by turning of said screw means.

5. An apparatus for grinding circular saw blades, comprising in combination, a support member; a first shaft member fixedly mounted on said support member; gripping means for gripping a circular saw blade and being mounted on said first shaft member for slidable movement therealong; a bearing member mounted on said support member for turning movement about said first shaft member; releasable clamping means mounted on said bearing member; at least one bar member extending across said bearing member transversely to said first shaft member and being releasably clamped to said bearing member by said clamping means so that said bar member may be adjustably connected to said bearing member; a second shaft member spaced from said first shaft member and being parallel thereto; a stop pin mounted for adjustable movement on said support member between said first and second shaft members and being parallel thereto; drive means connected to said second shaft member for rotating same and being slidably mounted on said bar member for movement therealong; and screw means mounted only for rotation on said bar member and engaging said drive means for moving the same along said bar member upon rotation of said screw means, whereby, when a circular saw blade to be ground is mounted in said gripping means on said first shaft member and engaged by said stop pin so as to prevent rotation of the circular saw blade and when a grinding wheel is mounted on said second shaft member for rotation therewith, the grinding wheel may have its location roughly adjusted with respect to the saw blade by moving said bar member in said clamping means when the latter is released and then clamping the same and the grinding wheel may have its location finely adjusted with respect to the saw blade by turning of said screw means.

References Cited in the file of this patent
UNITED STATES PATENTS

| | | |
|---|---|---|
| 158,404 | Crook et al. | Jan. 5, 1875 |
| 321,376 | Lyon | June 30, 1885 |
| 1,633,885 | Castillo | June 28, 1927 |
| 1,950,815 | Rhyne | Mar. 13, 1934 |
| 2,406,134 | Cameron | Aug. 20, 1946 |